G. A. H. KELLNER.
SIGHTING TELESCOPE FOR GUNS.
APPLICATION FILED DEC. 13, 1909.

1,000,607.

Patented Aug. 15, 1911.

4 SHEETS—SHEET 1.

WITNESSES:

INVENTOR:

COLUMBIA PLANOGRAPH CO., WASHINGTON, D. C.

G. A. H. KELLNER.
SIGHTING TELESCOPE FOR GUNS.
APPLICATION FILED DEC. 13, 1909.

1,000,607.

Patented Aug. 15, 1911.

4 SHEETS—SHEET 2.

WITNESSES:   INVENTOR:

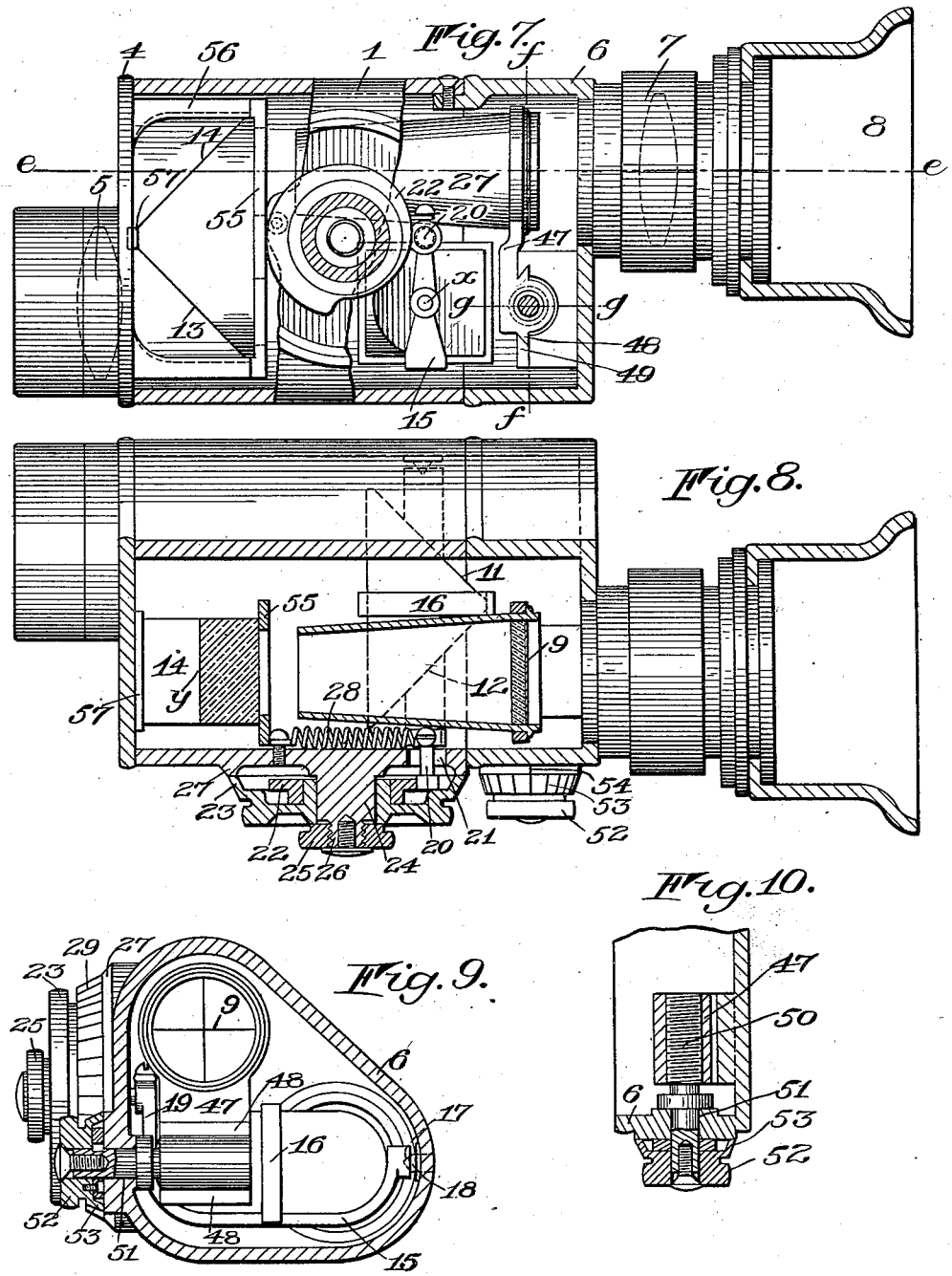

G. A. H. KELLNER.
SIGHTING TELESCOPE FOR GUNS.
APPLICATION FILED DEC. 13, 1909.

1,000,607.

Patented Aug. 15, 1911.
4 SHEETS—SHEET 4.

WITNESSES:

INVENTOR:

UNITED STATES PATENT OFFICE.

GUSTAV A. HERMANN KELLNER, OF ROCHESTER, NEW YORK, ASSIGNOR TO BAUSCH & LOMB OPTICAL COMPANY, OF ROCHESTER, NEW YORK, A CORPORATION OF NEW YORK.

SIGHTING-TELESCOPE FOR GUNS.

1,000,607.  Specification of Letters Patent. Patented Aug. 15, 1911.

Application filed December 13, 1909. Serial No. 532,806.

*To all whom it may concern:*

Be it known that I, GUSTAV A. HERMANN KELLNER, of Rochester, in the county of Monroe and State of New York, have invented certain new and useful Improvements in Sighting-Telescopes for Guns; and I do hereby declare the following to be a full, clear, and exact description of the same, reference being had to the accompanying drawings, forming a part of this specification, and to the reference-numerals marked thereon.

The present invention relates to gun sighting telescopes of the type having provision for accommodating the instrument to different ranges, and it has for an object to provide a self-contained construction adapted to be rigidly secured to the gun and having a great range of adjustment for elevation and windage with an eyepiece of a small size, thus preventing distortion as well as causing the image to be viewed on a straight line.

To these and other ends the invention consists in certain improvements and combinations of parts all as will be hereinafter more fully described, the novel features being pointed out in the claims at the end of the specification.

Figure 1:
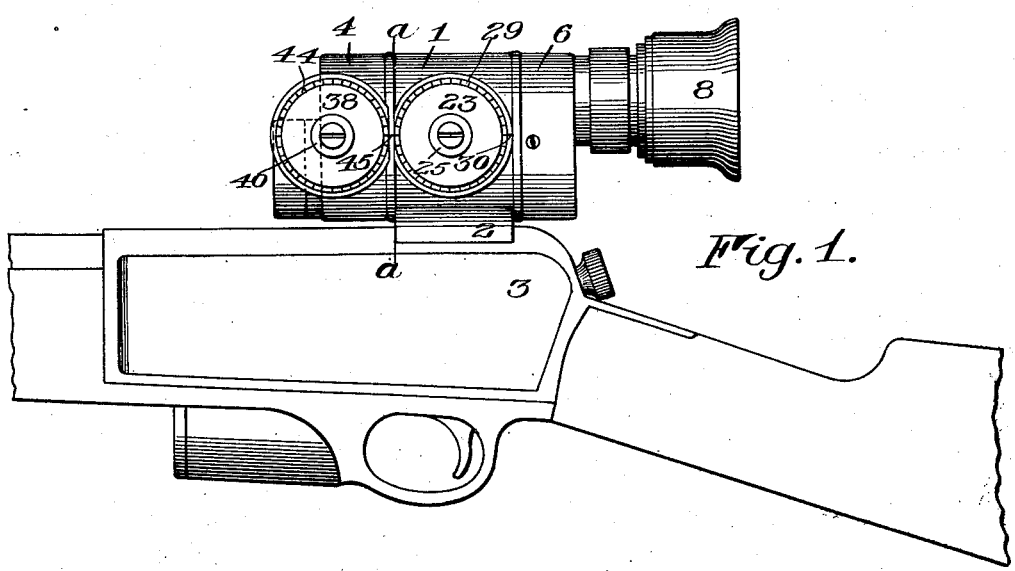
Figure 2:
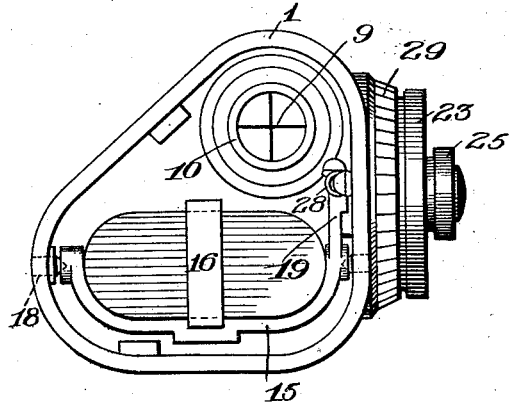
Figure 3:
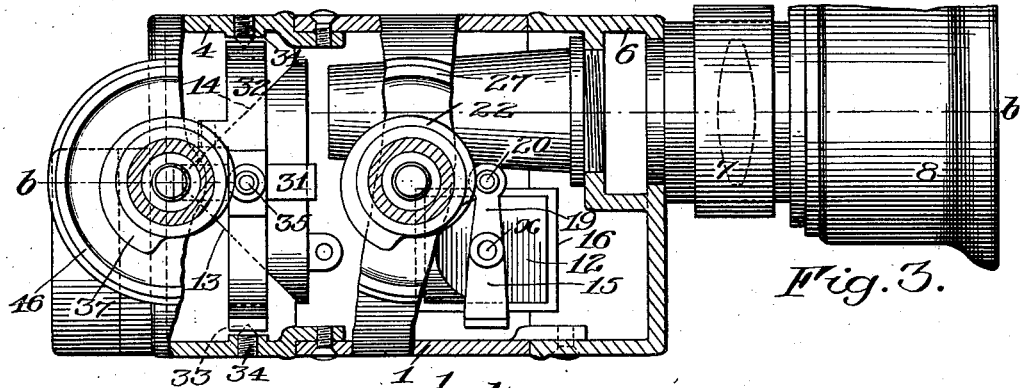
Figure 4:
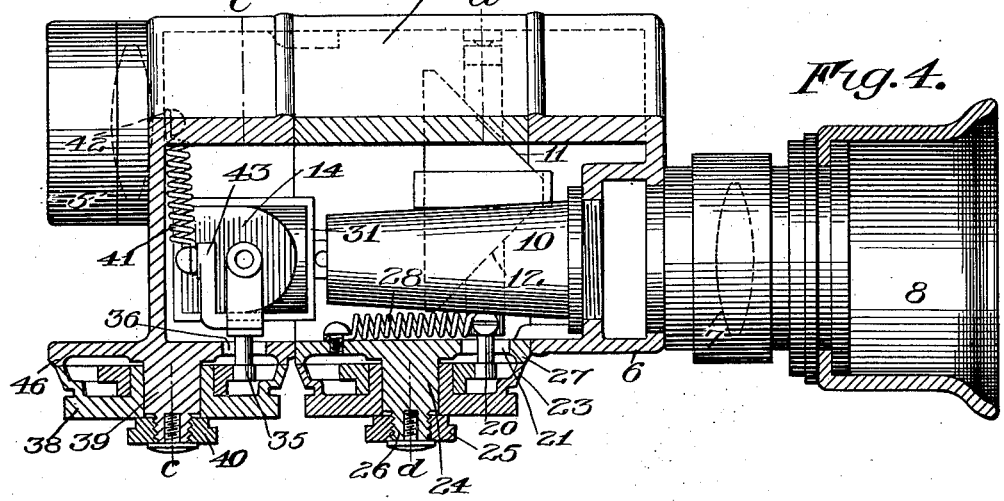
Figures 5, 6:
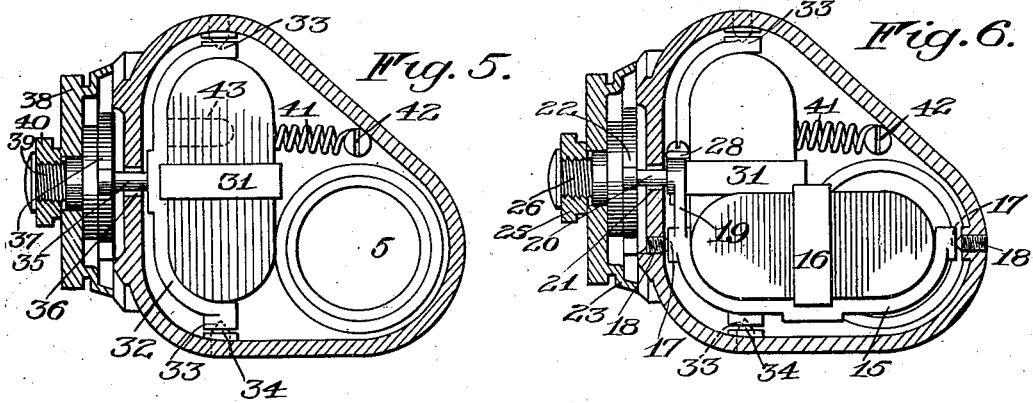
Figure 11:
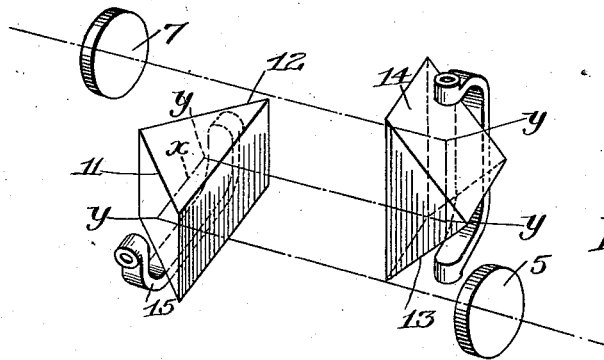
Figure 12:
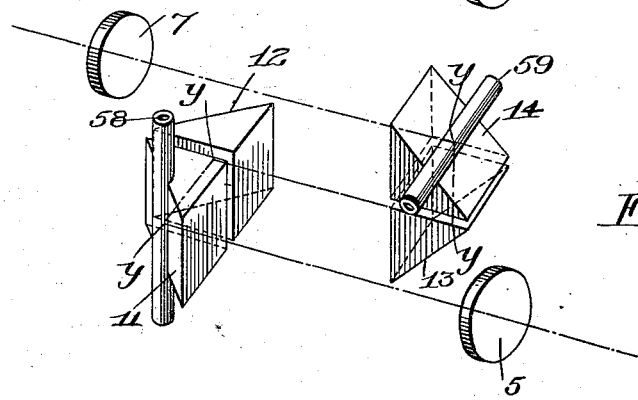
Figure 13:
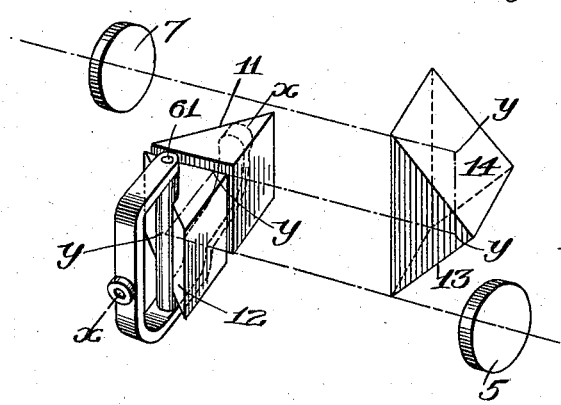

In the drawings: Figure 1 shows one embodiment of the invention in side elevation and attached to a gun, a portion only of which is shown; Fig. 2 is a section on the line *a—a* of Fig. 1; Fig. 3 is a view showing parts in central longitudinal section and other parts in elevation; Fig. 4 is a section on the line *b—b* of Fig. 3; Fig. 5 is a section on the line *c—c* of Fig. 4; Fig. 6 is a section on the line *d—d* of Fig. 4; Fig. 7 is a vertical central section of another embodiment of the invention, interior and other parts being shown in elevation; Fig. 8 is a section on the line *e—e* of Fig. 7; Fig. 9 is a section on the line *f—f* of Fig. 7; Fig. 10 is a section on the line *g—g* of Fig. 7; Fig. 11 shows diagrammatically the optical parts of the instrument illustrated in Figs. 1 to 6; Fig. 12 shows diagrammatically another embodiment of the invention, and Fig. 13 shows diagrammatically a still further embodiment of the invention.

In this invention, a relative lateral movement between the cross hairs and the image viewed at the eyepiece is effected in such a manner that the central portion of the cross hairs does not shift with relation to the eyepiece for range adjustment and it is therefore possible to utilize the entire field of the eyepiece lens so that the latter may be of a minimum size and the image received by the eye will be clear and free from distortion. Further, this adjustment permits the casing, which contains the optical parts of the telescope, to be maintained in a fixed or rigid relation to the gun parts so that the telescope may be reduced to a minimum size and will not be subjected to displacement on the gun.

In the embodiment shown in Figs. 1 to 6 and illustrated diagrammatically in Fig. 11 a central part 1 of a telescope casing is rigidly secured at 2 to the gun 3 so as to be held in fixed relation to the latter. In addition to the central part said casing comprises a front end 4 carrying an objective 5, and a rear end 6 carrying an eyepiece 7, the latter, if desirable, having a rubber or other yielding eye cup 8 secured thereto. The cross hairs 9 of the telescope, or other suitable gaging means, are in this instance carried by the end wall 6, and arranged within a tube 10 projecting from the inner side of the end wall in alinement with the eyepiece 7 to prevent all but direct rays from reaching the cross hairs. Optically arranged between the cross hairs and the objective 5 is a reflecting means which, in this instance, embodies reflectors 11 and 12 arranged at an angle to each other, preferably at right angles and being formed by reflecting faces on a suitable prism horizontally arranged in the rear part of the casing and below the tube 10 to receive the image from the objective 5. The face 12 of the prism directs the image to a reflector 13 which in turn directs it to a reflector 14, the reflectors 13 and 14 being arranged at right angles to each other and formed by reflecting surfaces on a vertically arranged prism. From the reflector 14 the image is directed to the eyepiece 7 and cross hairs 9 through the tube 10. The reflecting means in this embodiment has provision which permits the image to be shifted both vertically and horizontally relatively to the cross hairs in order that the telescope may be changed or corrected to agree with the range or distance of the object at which the gun is fired or may be changed or corrected to agree with wind conditions which would affect the travel of the projectile. In this instance, these results are effected by mounting the prisms 11, 12 and 13, 14 so that they may each turn about an axis coincident with that part $x$ of the optical axis of the instrument located between its reflectors and intersecting the points of reflection $y$ of the optical axis of the images. The turning of the prism carrying reflectors 11 and 12 shifts the image vertically with relation to the cross hairs and this adjustment is therefore used for correcting or changing the telescope to agree with the range, while the shifting of the prism carrying the reflectors 13 and 14 moves the image horizontally relatively to the cross hairs and is therefore used for correcting or changing the instrument for windage. The mechanism for moving the prism carrying reflectors 11 and 12 in this instance comprises a carrier in the form of a U-shaped member 15 having a band or frame 16 surrounding the prism, the arms of carrier 15 being socketed at 17 near their ends to receive bearings 18 carried by the central portion 1 of the casing. An arm 19 is extended upwardly from the carrier and is provided with a projection 20 passing through a slot 21 in the casing to coöperate with a rotary cam 22 on the exterior of the casing, the projection being held in engagement with the cam by a spring 28 secured at one end to the central casing member 1 and at its other end to the carrier. The cam 22 is arranged on the interior of a hollow dial or indicator 23 that turns on the bearing 24 integral with the casing member 1 and is held on said bearing by a nut 25 having screw threaded engagement with the outer reduced portion 26 on the bearing. The dial not only incloses the cam but it coöperates with the raised portion 27 on the casing and prevents the entrance of dust into the latter through the opening 21. The dial or indicator is provided with graduations 29, any division of which may be made to register with the index 30 on the casing. The shifting of the prism carrying the reflectors 13 and 14 is obtained in this embodiment by securing the prism by means of a band 31 to a carrier 32 preferably of U-shape and having its ends pocketed at 33 to receive pointed bearings 34 on the casing member 4. A projection 35 on the carrier 32 operates through an opening 36 in the end member 4 and coöperates with the rotary cam 37 on the exterior of the casing, the projection being held in engagement with the cam by a coil spring 41 secured at one end 42 to the end portion 4 and at its other end to an arm 43 extended from the carrier 32. The cam 37 is carried on the inner side of the hollow indicator or dial 38 which is journaled on projection 39 formed on the casing member 4 and is held on said bearing projection by a nut 40. The dial is provided with graduations 44 to register with an index 45 on the casing, and the latter is provided with a ridge 46 which coöperates with the dial to prevent dust from passing into the casing through the opening 36. In using this embodiment of the invention, the range of the object and the condition of the wind are ascertained by suitable means. Then the dials 23 and 38 are turned to positions to correspond respectively with the range and with the wind conditions, thus shifting the prism reflectors to change the position of the optical axis of the reflected image with relation to the cross hairs, this change, of course, corresponding to the range and to the windage and necessitating that the user of the gun point the latter properly in order that the image may be seen in proper position with relation to the cross hairs.

In the embodiment of the invention shown in Figs. 7 to 10, the casing comprises a central portion 1 closed at its ends by portions 4 and 6, the portion 4 carrying an objective 5, while the portion 6 carries an eyepiece 7 and cross hairs 9. The cross hairs in this instance are arranged within a tube 27 and are movably supported upon the carrier 47 which has guides 49 on the end closure 6. The movement of the carrier is provided in order to change the position of the cross hairs with reference to the eyepiece so that the instrument may be corrected for windage and the means for effecting this movement comprises in this instance a screw 50 journaled at 51 in the casing member 6 and operating in the carrier 47, a thumb piece 52 being provided on the exterior of the screw and carrying a dial or indicator 53, the divisions of which are capable of registering with an index 54 on the casing. A reflecting means is interposed between the objective 5 and the cross hairs and comprises the horizontally arranged pair of reflectors 11 and 12 formed by angularly arranged reflecting surfaces on a prism; and the vertically arranged pair of reflectors 13 and 14 formed by angularly arranged reflecting surfaces on another prism. The reflecting surfaces 11 and 12 are mounted to turn about an axis coincident with that portion of the optical axis of the instrument lying between the reflecting surfaces 11 and 12 in the same manner as the similar prism in the embodiment shown in Figs. 1 to 6, and the mechanism for effecting this movement in this embodiment is also the same as that illustrated in Figs. 1 to 6 and will therefore not be again described. The reflecting surfaces 13 and 14 in this instance are not movable as a correction of the instrument for windage is obtained by moving the cross hairs in the manner previously described. The prism carrying these reflecting surfaces lies in engagement with a resilient pad 57 and two groove posts 56 on the end closure 4, being held in this position by a perforated plate 55 screwed to the free ends of the posts. It is apparent that an image formed by the objective 5 will be reflected by the surface 11 to the surface 12, thence to the surface 13 and again to the surface 14 where it may be viewed by the eyepiece 7. The position of this image with reference to the cross hairs may be changed for correcting the instrument for the windage by shifting the cross hairs horizontally through the medium of screw 50, the dial or indicator 53 being employed for determining the extent of this movement. For correcting the instrument to agree with the range, the carrier 15 is moved about the axis $x$ and causes the image formed by the objective to be moved vertically with reference to the cross hairs. In this embodiment the cross hairs move with reference to the eyepiece lens but as this movement is only effected for the windage adjustment, which at greatest is but very slight, the eyepiece lens may have substantially the same diameter as that employed in the construction shown in Figs. 1 to 6.

The results accomplished by the two foregoing embodiments may also be obtained by the embodiments shown diagrammatically in Figs. 12 and 13. In the former the reflecting surfaces 11 and 12 are formed on two separate prisms as are also the reflecting surfaces 13 and 14. One of each of these pairs of prisms is rotatable about an axis 58 parallel with its reflecting surface and intersecting the point $y$ of reflection of the optical axis of the instrument at right angles to said axis. A turning of the reflector 11 corrects the instrument to agree with the windage, while the turning of the reflector 14 corrects the instrument to agree with the range. In Fig. 13 the reflectors 13 and 14 are formed on a single rigidly secured prism, and reflectors 11 and 12 are formed on separate prisms and are mounted to turn about a common axis $x$ which intersects the reflected point $y$ of the optical axis of the instrument and is coincident with that part of the optical axis of the instrument lying between them, while the reflector 12 is mounted to turn about an axis 61 lying in the plane of the reflecting surface and intersecting the point $y$ of reflection of the optical axis of the instrument at right angles to said axis. To correct this embodiment to agree with the range both of the reflectors 11 and 12 are turned about the axis $x$ while correction for the windage is obtained by turning the reflector 12 about the axis 61.

It will thus be seen that in all of the embodiments of this invention, the reflecting means has provision which permits the reflected image to be shifted laterally relatively to the cross hairs so that the instrument may be made to agree with the distance or range of the object at which the gun is to be fired. The reflecting means in most of the embodiments also has provision for shifting the reflected image with reference to the cross hairs for windage. Preferably these results are effected by turning one or more reflectors about axes which intersect the point of reflection of the optical axis of the instrument. The means for effecting the movement of the reflector or reflectors may be of any suitable construction, but those herein shown are simple in operation, inexpensive to manufacture and not liable to get out of order. By adjusting the reflecting means instead of the sight as a whole, or the cross hairs, it is possible to mount the casing of the telescope in firm and rigid relation to the gun without providing a bulky structure and it is not necessary to enlarge the eyepiece in order that the cross hairs and the reflected image may be viewed without distortion.

I claim as my invention:

1. In a sighting telescope for guns, the combination with an objective and cross hairs, of reflecting means optically arranged between the objective and the cross hairs, having means for deflecting the pencil of light rays passing through the objective to change the position of the image laterally with relation to the cross hairs.

2. In a sighting telescope for guns, the combination with an objective and cross hairs, of a reflector optically arranged between them and adjustable with relation to both for changing the position of the image laterally with relation to the cross hairs.

3. In a sighting telescope for guns, the combination with an objective and cross hairs, of a reflector optically arranged between the objective and the cross hairs and mounted to turn relatively to both of them about an axis intersecting the point of reflection of the optical axis of the image in order that the latter may be shifted laterally relatively to the cross hairs.

4. In a sighting telescope for guns, the combination with an objective and cross hairs, of a pair of reflectors arranged at an angle to each other and mounted to turn about an axis coincident with that portion of the optical axis of the instrument lying between them, in order to shift the image laterally relatively to the cross hairs.

5. In a sighting telescope for guns, the combination with an objective and cross hairs, of reflecting means between them embodying a horizontally arranged pair of reflectors having its members arranged at an angle to each other and adjustable about an axis coincident with that portion of the optical axis of the instrument lying between them.

6. In a sighting telescope for guns, the combination with an objective and cross hairs, of reflecting means optically arranged between them embodying a horizontally arranged pair of reflectors and a vertically-arranged pair of reflectors, the members of each pair being arranged at an angle to each other and the horizontally arranged pair being mounted to turn about that portion of the optical axis between them to vertically adjust the position of the image with reference to the cross hairs.

7. In a sighting telescope for guns, the combination with an objective and cross hairs, of reflecting means optically arranged between them embodying a vertically arranged pair of reflectors having its members arranged at an angle to each other and adjustable about an axis coincident with that portion of the optical axis lying between them.

8. In a sighting telescope for guns, the combination with an objective and cross hairs, of reflecting means optically arranged between them comprising a vertically arranged pair of reflectors and a horizontally arranged pair of reflectors, the members of each pair being arranged at angles to each other, and the members of the vertically arranged pair being adjustable about an axis coincident with that portion of the optical axis lying between them.

9. In a sighting telescope for guns, the combination with an objective, and cross hairs, of reflecting means optically arranged between them having provision for correcting the telescope to agree with both the windage and the range.

10. In a sighting telescope for guns, the combination with an objective and cross hairs, of reflecting means optically arranged between them having provision for correcting the telescope to agree with the range, and also provision for correcting the telescope to agree with the windage.

11. In a sighting telescope for guns, the combination with an objective and cross hairs, of reflecting means optically arranged between them embodying a movable prism having two reflecting surfaces arranged at an angle to each other and mounted to turn about an axis coincident with that portion of the optical axis of the instrument extending between the reflecting surfaces.

12. In a sighting telescope for guns, the combination with an objective and cross hairs, of reflecting means optically arranged between them embodying a movable reflector, a carrier for the reflector mounted to turn about an axis intersecting the point of reflection of the optical axis of the instrument by said reflector, and a cam coöperating with said carrier to effect a movement of the latter about said axis.

13. In a sighting telescope for guns, the combination with an objective and cross hairs, of reflecting means optically arranged between them embodying a movable reflector, a carrier for the reflector movable to change the position of the image vertically with reference to the cross hairs, and an indicator having connection with the carrier for moving the latter.

14. In a sighting telescope for guns, the combination with an objective, cross hairs and ocular, of reflecting means optically arranged between the objective and cross hairs embodying a movable reflector, an adjustable carrier for the reflector turning about the axis of the path of reflection of the instrument and adjustable independently of the objective and ocular, and an indicator connected to the carrier for adjusting it.

15. In a sighting telescope, the combination with an objective and the cross hairs, of reflecting means optically arranged between them embodying a movable prism having two reflecting surfaces arranged at an angle to each other, a carrier for said reflector mounted to turn about an axis coincident to that part of the optical axis of the instrument lying between the two reflectors, means for moving said carrier, and an indicator moving with said means.

16. In a sighting telescope, the combination with a casing, and an objective and cross hairs carried by the casing, of reflecting means within the casing optically arranged between the cross hairs and the objective and embodying a movable prism having two reflecting surfaces arranged at an angle to each other, a carrier for said prism having a portion extending to the exterior of the casing, a cam arranged on the exterior of the casing and coöperating with the carrier, and a dial inclosing the cam.

17. In a sighting telescope for guns, the combination with a casing having removable closures at opposite ends thereof, of an objective and a pair of reflectors carried by one closure, an eyepiece and cross hairs carried by the other closure, the eyepiece receiving an image from one of the reflectors, and a pair of reflectors carried by the central portion of the casing, receiving an image from the objective and reflecting the same to the first named reflectors.

18. In a sighting telescope for guns, the combination with a casing having removable end closures, of an objective and a prism reflector carried by one closure, an eyepiece and cross hairs carried by the other closure, the eyepiece receiving an image from one of the reflectors, a movable prism reflector mounted on the central portion of the casing, receiving an image from the objective and reflecting the same to the first-named prism, and means for moving the movable prism carried by the central portion of the casing.

GUSTAV A. HERMANN KELLNER.

Witnesses:
W. B. RAYTON,
NELSON COPP.

---

Copies of this patent may be obtained for five cents each, by addressing the "Commissioner of Patents, Washington, D. C."